April 10, 1928. 1,665,892
M. O'DEA
AUTOMOBILE LUGGAGE CARRIER
Filed June 23, 1924
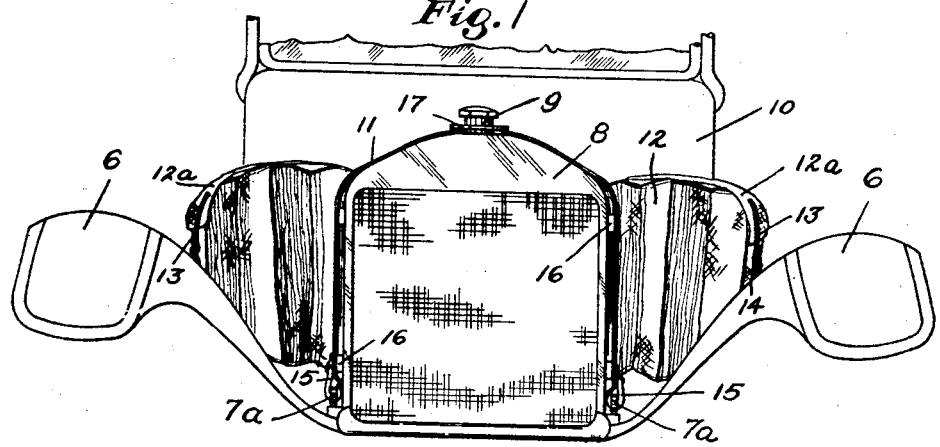
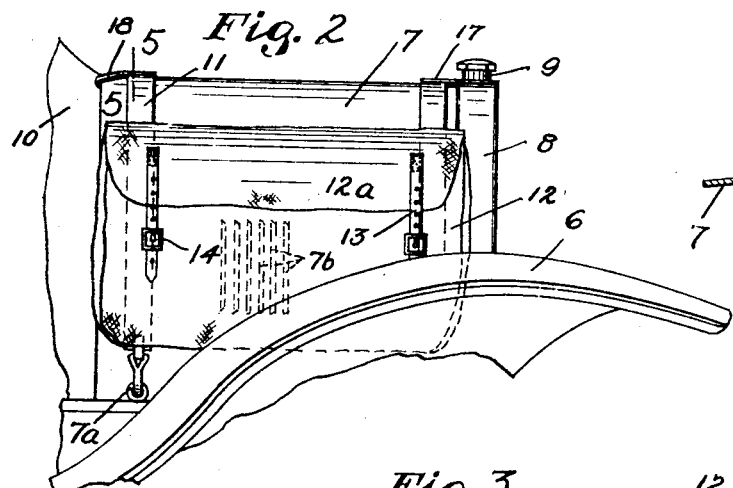
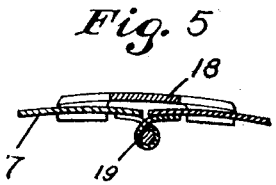
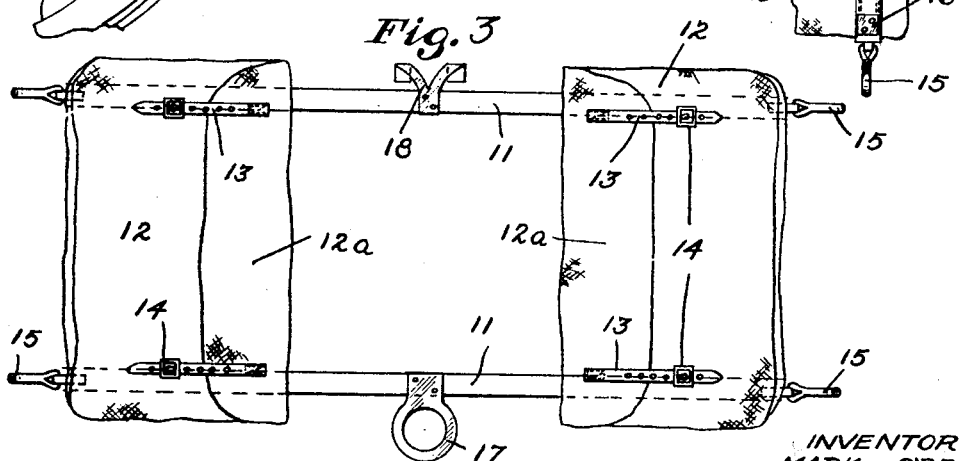
INVENTOR
MARK O'DEA
BY HIS ATTORNEY
James F. Williamson Patented Apr. 10, 1928.

1,665,892

UNITED STATES PATENT OFFICE.

MARK O'DEA, OF ST. PAUL, MINNESOTA.

AUTOMOBILE LUGGAGE CARRIER.

Application filed June 23, 1924. Serial No. 721,769.

This invention has for its object to provide a simple but highly efficient luggage carrier for automobiles which will be disposed on and carried by the hood of the automobile.

It is a more specific object to provide a device of this kind, having a pair of flexible and expanding receptacles, disposed respectively at each side of the automobile hood.

It is a further object in such a device to provide means detachably securing a luggage carrier about the hood to well known parts of the automobile adjacent thereto.

It is still another object of the invention to provide a means for holding the receptacles in spaced relation to the sides of the hood so that the air forced into the hood, may be expelled thru the vents in the side of the hood free from interference of said rceptacles.

These and other objects and advantages of the device will be fully set forth in the following description made in connection with the accompanying drawings, in which like reference characters refer to similar parts thruout the several views, and in which Fig. 1 is a front elevation of a portion of an automobile with this invention mounted thereon;

Fig. 2 is a side elevation of the same;

Fig. 3 is a plan view of the invention detached;

Fig. 4 is a fragmentary rear elevation of a lower corner of one of the receptacles with a portion of one of the straps stitched thereto.

Fig. 5 is an enlarged vertical section taken on the line 5—5 of Figure 2.

A portion of an automobile is illustrated in Figs. 1 and 2, having the usual fenders 6, the hood 7, hood fasteners 7$^A$, air vents 7$^B$, the radiator 8, radiator cap 9, and body 10. In the preferred form of the invention, a pair of relatively narrow parallel spaced straps 11, form a supporting harness adapted to extend over the top and sides of the automobile hood 7. A pair of flexible expanding receptacles 12 are stitched or otherwise secured to straps 11, on either side of the central portions thereof, thus connecting said straps, and keeping them in proper parallel spaced relation. The sides and bottoms of the receptacles are preferably of accordion structure, such as is used in expanding suit cases and hand bags. The flexible receptacles are open at the top portions for the disposition of the articles to be carried within, and covers 12$^A$ are provided and equipped with straps 13, adapted to pass thru an be engaged by buckles 14, on the outer side of receptacles 12.

When the articles to be secured have been disposed in the receptacles 12, the straps 13, are tightly secured to the buckles 14, and assist in supporting the load carried.

At the bottom ends of the straps 11, detachable means are secured preferably in the form of snap buckles 15, which are adapted to engage the handle members of the hood fasteners 7$^A$, when the luggage carrier is mounted on the hood for use.

The harness is thus fastened down securely over the top and side portions of the hood with the receptacles 12, disposed at either side thereof between the hood and the aprons of the fenders 6. If a large load is carried, the aprons of the fenders will assist in supporting the same.

In order that the back sides of the receptacles 12 will not be fastened tightly against the air escape vents 7$^B$ in the hood, a plurality of small spaced blocks 16 of non-abrasive material, such as rubber, are secured at intervals to the underside of the straps 11 disposed in back of the receptacles 12. When the device is mounted on the hood, these blocks will hold the receptacles in spaced relation to the sides of the hood, permitting the air forced thru the radiator, into the hood, to be expelled thru the vents 7$^B$, without interference from the backs of the receptacles 12.

The device is further detachably secured in proper position on the hood in the following manner: An annular anchoring member 17, secured to the central portion of the front strap 11, and adapted to be slipped over the radiator cap 9, prevents longitudinal movement of said strap.

A Y-shaped clip 18, is secured to the central portion of the rear strap 11, and is adapted to engage the rear edge of the top of the hood 7 with its clip members of the Y disposed at either side of the hinge 19, at the top of the hood.

The harness is thus seen to be detachably fastened down over the hood 7, and also secured against longitudinal movement in either a forward or rearward direction.

The device may be quickly mounted for use, and the articles to be carried readily disposed in the receptacles, and the covers tightly strapped down.

The device has been found especially adaptable for touring purposes where it is desired to carry clothing, blankets, cooking utensils, etc., the collapsible feature of the receptacle making it possible for loads of varied sizes to be compactly carried.

The articles carried will be completely covered and protected from the rain and dust, and will be securely held so that slipping or jolting within the receptacles will be prevented.

Most luggage carriers in use today for automobiles are mounted on the running boards near the ground where they not only constitute an obstruction to persons getting in and out of the automobiles, but moreover permit much dust to accumulate on the articles carried therein. By providing a luggage carrier to be mounted on the hood of the automobile, with the receptacles disposed above the aprons of the fenders, little dust will reach the carrier, and the articles within, due to the closed nature of the receptacles 12, will be entirely protected from rain and such small amounts of dust as fall thereon.

It is to be understood that various changes may be made in the form, details and arrangement of parts without departing from the scope of this invention.

What is claimed is:—

1. A luggage carrier for automobiles comprising a supporting means adapted to extend over the top and side portions of an automobile hood, a pair of receptacles secured to said supporting means, disposed respectively at each side of said hood and means secured to the rear edge of said supporting means for securing the same to the rear portion of said automobile hood.

2. In a luggage carrier for automobiles, a flexible supporting means adapted to extend over the top and the side portions of an automobile hood, a pair of receptacles secured to said supporting means and disposed respectively at the sides of the hood, means for anchoring the forward portion of said supporting means to the radiator cap of an automobile, means for anchoring the rear portion of said supporting means to the rear edge of the hood of an automobile, and means for anchoring the depending ends of said supporting means to the hood fasteners of an automobile.

3. In a luggage carrier for automobiles, a harness adapted to extend over the top and side portions of an automobile hood, a pair of receptacles secured to said supporting means and disposed respectively at the sides of the hood, means for anchoring the forward portion of said harness against rearward displacement, a hook on the rear portion of said harness adapted to engage the rear edge of said hood, and means for anchoring the depending ends of said harness.

In testimony whereof I affix my signature.

MARK O'DEA.